April 9, 1929.  E. B. SMITH  1,708,333
STRAIN GAUGE
Filed Dec. 14, 1926
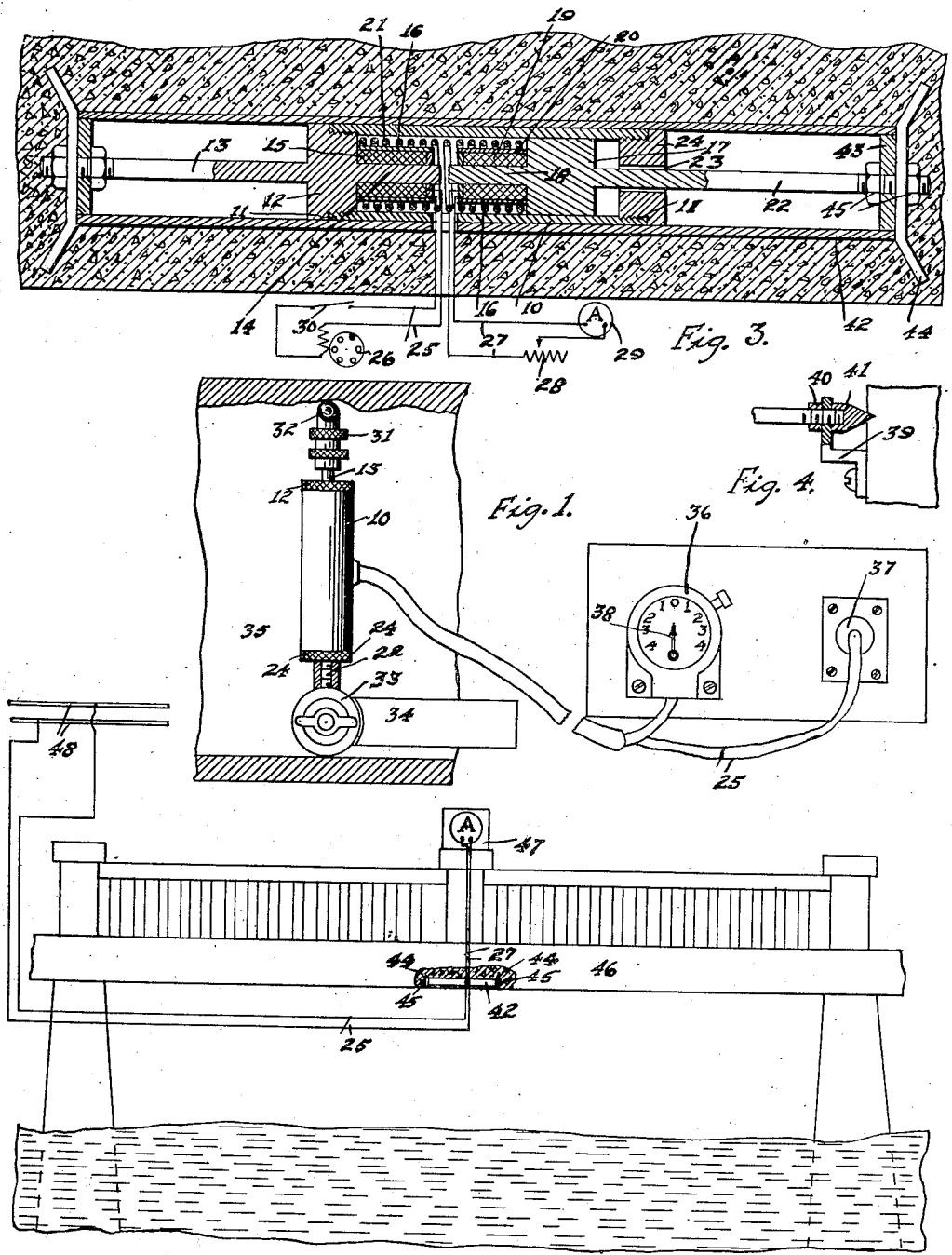
Inventor.
Earl B. Smith
by Owing & Hague, Attorneys.

Patented Apr. 9, 1929.

1,708,333

UNITED STATES PATENT OFFICE.

EARL B. SMITH, OF AMES, IOWA, ASSIGNOR TO IOWA STATE COLLEGE OF AGRICULTURE AND MECHANICAL ARTS, OF AMES, IOWA, A CORPORATION OF IOWA.

STRAIN GAUGE.

Application filed December 14, 1926. Serial No. 154,834.

The object of my invention is to provide an instrument which is simple, durable and accurate, that may be readily, quickly and easily applied or attached to one or more parts or members of machines, structures and apparatus, or to a sample or piece of material, for the purpose of indicating and measuring small deformations or movements caused by loads or forces.

A further object is to provide a strain gauge that may be placed in distant and inaccessible places where the deformations or movement to be measured can not be seen but must be indicated at other convenient and accessible places. The deformations or movements to be detected are indicated by means of the action of an alternating or interrupted electric current in one electromagnet coil mounted in inductive relation to another electromagnet coil and having a variable air gap in the magnetic circuit.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of one form of my improved instrument showing the manner in which it is used as a surface gauge, a portion of the cylinder to which it is applied being shown in section.

Figure 2 is a side elevation of a bridge showing the manner in which my improved device may be applied to determine any deformations in the bridge beam.

Figure 3 is an enlarged, longitudinal, sectional view of my gauge shown in detail in the manner in which it is mounted in the concrete structure.

Figure 4 is a detail view of a modified means for supporting the gauge to one of the movable members under consideration.

My improved gauge comprises a cylindrical casing 10 formed of magnetic material having the inner surface of each end provided with a screw threaded portion 11. One end of said casing is provided with a head 12 having an outwardly projecting pin 13. The head 12 is also provided with an inwardly projecting stem 14 which serves as a core for the electric coil 15. Said coil 15 is enclosed in the shell 16 somewhat smaller in diameter than the casing 10, and arranged concentrically therein.

Slidably mounted at the other end of the casing 10 is a head 17 having an inwardly projecting core 18. Said core and said head are also formed of magnetic material. The core 18 is designed to carry a coil 19, said coil also being provided with a shell 20. Said shells 16 and 20 are provided for protecting the coils 15 and 19 against the spring 21 which surrounds said coils and rests within the casing 10. One end of said spring rests against the head 12, while the other end rests against the head 18 so that yieldable pressure is applied to the head 18 to cause it to move outwardly. The head 18 is provided with a stem 22 slidably mounted in an opening 23 in the head 24 of the casing 10. The coil 15 is provided with conductors 25 which include mechanism 26 for generating an alternating current in said coil 15. The coil 19 is provided with conductors 27 which include variable resistances 28 and an amperemeter 29 or other current indicating device. The conductors 25 also include a switch 30.

In Figure 1 of the drawings I have illustrated my device used as a surface gauge in which case the stem 13 is provided with a head 31, which is screwed into position in the outer end of the stem 13. Said head 31 has a ball or rounded portion 32. The outer end of the stem 22 is mounted in a head 33 adjustably secured to a bar 34, said bar being designed to be supported in a tool rest of a lathe.

By this arrangement it will be seen that if the bar 34 is moved longitudinally through the tubular member 35, the rounded portion 32 may be caused to engage the inner surface of said tubular member and any unevenness in said surface will cause the member 22 and the head 18 to be moved relative to the members 12 and 14. It will be seen that if an alternating or interrupted current is induced in the coil 15, a current will be induced in the coil 19, the value of which will depend largely upon the size of the air gap between the ends of the members 14 and 18. Any movement of the member 18 relative to the member 14 will cause said air gap to be increased or decreased and a fluctuation in the induced current in the coil 19 will result. This fluctuation may be indicated by means of an amperemeter 36. An alternating current for the coil 15 may be supplied through a plug 37 attached to the ordinary alternating current lighting system. Thus it will be seen that any variation in the inner surface of the tubular member 35 will be readily determined by the oscillation of the index 38 of the amperemeter 36. Said amperemeter may be graduated if so desired so the measurement of this variation may be taken, in which case the resistance 28 may be untilized to assist in bringing the index member 38 to its zero position. Otherwise the said resistance 28 is unnecessary.

The instrument may be connected between two members which are slightly movable toward and from each other, if so desired, by simply providing brackets 39, see Fig. 4, and securing the same to the movable members. The said brackets are provided with suitable openings for receiving the threaded ends of the members 13 and 22, which are secured to said bracket by means of nuts 40 and 41, in the manner clearly illustrated in Figure 4.

My improved instrument is particularly designed to register or indicate deformations in beam structures. If the beams are formed of concrete, or any other plastic material, then the instrument may be imbedded permanently in the beams near the upper and lower edges of the same, in the manner clearly illustrated in Figures 2 and 3. In this case it is preferable to provide a casing 42, formed of elastic material such as rubber, for receiving the instrument. Each end of the casing is provided with a rigid head member 43 and anchoring bars 44. The said head member and the bars 44 are secured to the outer end of the members 13 and 22 by means of suitable nuts 45. The conductors 25 and 27 may be enclosed in a waterproof tubing. The casing 24, together with the instrument contained therein, is inserted in the plastic material at the time the beam is being molded. It will then be seen that the deformation of that portion of the beam between the bars 44 may be easily and quickly ascertained. When the instrument is thus used, the spring 21 is unnecessary.

Thus it will be seen that I have provided an instrument or strain gauge of simple, durable and inexpensive construction, which may be mounted permanently between two members which move slightly toward or from each other, and the amount of said movement measured; or the instrument may be mounted permanently either adjacent to one side of the beam or embedded therein in such a manner that an engineer may determine whether any deformation has taken place and the amount of such deformation even if the strain gauge is located in an inaccessible position and a considerable distance from the point of observation.

Figure 2 shows one manner in which the device may be applied. The numeral 45 indicates the beam of a bridge while the instrument is located in the central portion in such a manner that any sagging of the beam at its central portion will be indicated by means of the amperemeter 47. An alternating current may be taken from the electric light lines 48. A recording instrument may be substituted for the amperemeter if so desired, and a record kept of all of the deflections of the bridge for a predetermined length of time.

I claim as my invention:

1. In combination with a beam formed of plastic material, an elastic casing embedded therein, a rigid head member for each end of said elastic casing, means for anchoring each of said head members to said beam, and means for indicating movements of said head members toward and from each other, said means comprising a cylindrical casing mounted in the central portion of said elastic casing, an electromagnet fixed in one end of said casing and provided with an outwardly projecting stem mounted in one of said head members, an induction coil having a core member slidably mounted in the opposite end of said casing to move toward and from the first said core member, the said slidable member having an outwardly projecting stem anchored to the other one of said head members, a current indicating device in circuit with said induction coil, and means for introducing an alternating current in said electromagnet.

2. In combination with a beam formed of plastic material, an elastic casing embedded therein, a rigid head member for each end of said elastic casing, means for anchoring each of said head members to said beam, an indicator supported outside of said beam, and means mounted within said elastic casing and actuated by the movements of said head members toward and from each other for controlling said indicator.

Des Moines, Iowa, November 6, 1926.

EARL B. SMITH.